May 24, 1932.  H. SINCLAIR  1,859,607
HYDRAULIC TRANSMISSION GEAR AND BRAKE
Filed June 17, 1929  5 Sheets-Sheet 1
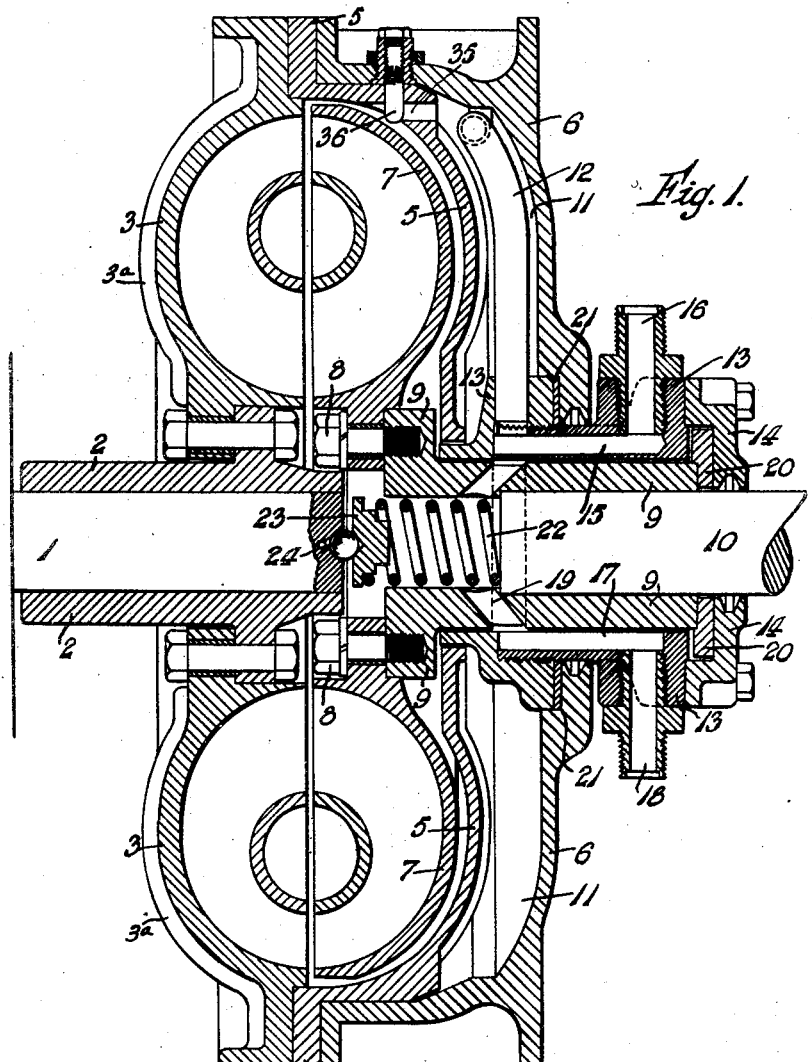
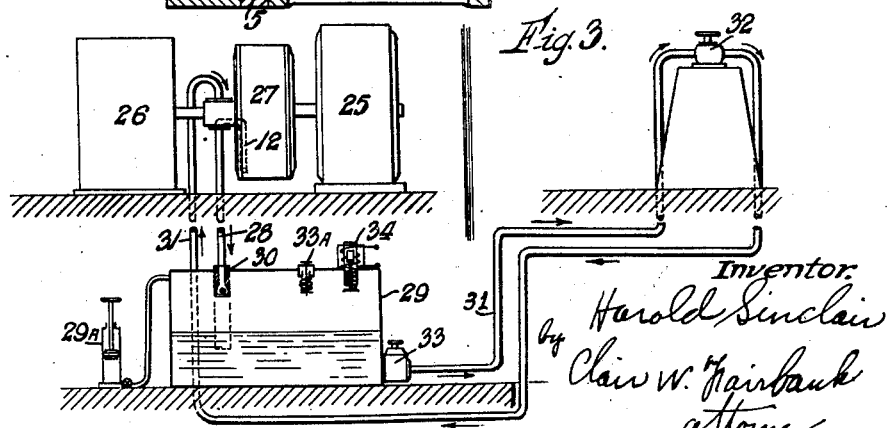

May 24, 1932.   H. SINCLAIR   1,859,607
HYDRAULIC TRANSMISSION GEAR AND BRAKE
Filed June 17, 1929   5 Sheets-Sheet 2

Inventor:
Harold Sinclair
by Clair W. Fairbank
attorney

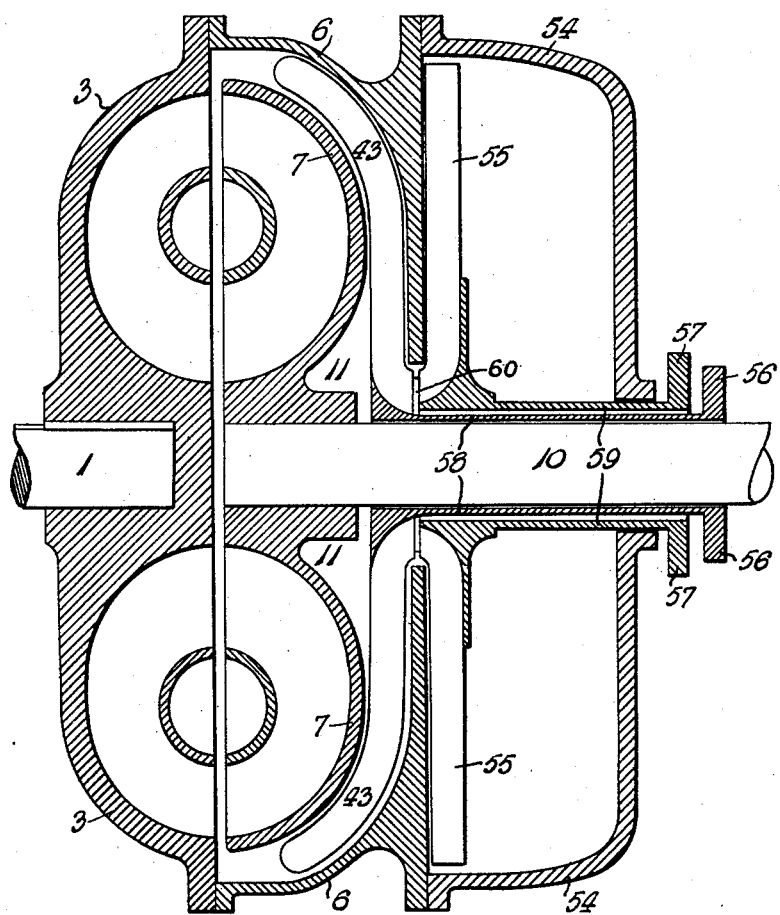

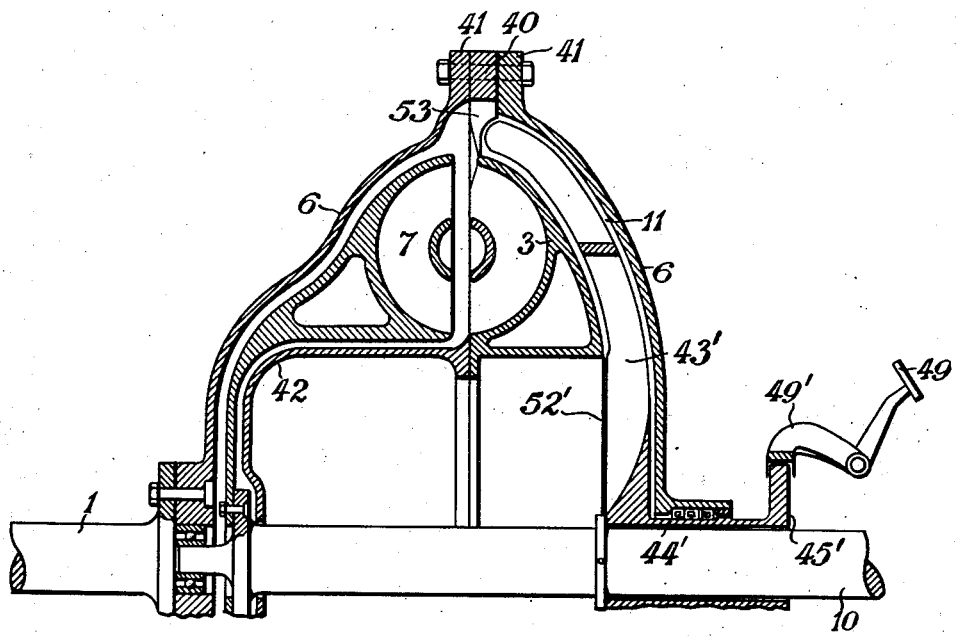

UNITED STATES PATENT OFFICE

HAROLD SINCLAIR, OF SURBITON HILL, ENGLAND

HYDRAULIC TRANSMISSION GEAR AND BRAKE

Application filed June 17, 1929, Serial No. 371,658, and in Great Britain October 17, 1928.

This invention relates to improvements in hydraulic transmission gears and brakes.

One of the objects of the invention is to provide in conjunction with such gears or brakes means for filling and emptying the working chamber to any desired extent, such means making use of the energy of motion of the liquid within the gear to effect its transfer from the working chamber to a reservoir chamber within or integral with the coupling or to an external chamber, and vice versa.

One arrangement embodying the invention is illustrated in the accompanying drawings, in which Fig. 1 is a sectional elevation of a Föttinger type coupling fitted with the liquid transfer means according to the present invention, the tubes connecting the said means to an external reservoir chamber and this chamber itself being omitted, while Figs. 3 and 4 show diagrammatically the general arrangement of driving machine, coupling, driven machine and the connections of the coupling to a pressure feed tank and a gravity feed tank respectively.

Fig. 7 is a sectional elevation of one half of a further arrangement in accordance with the invention, and Fig. 8 is a view similar to Fig. 5, but showing a further form of the invention.

Figure 2:
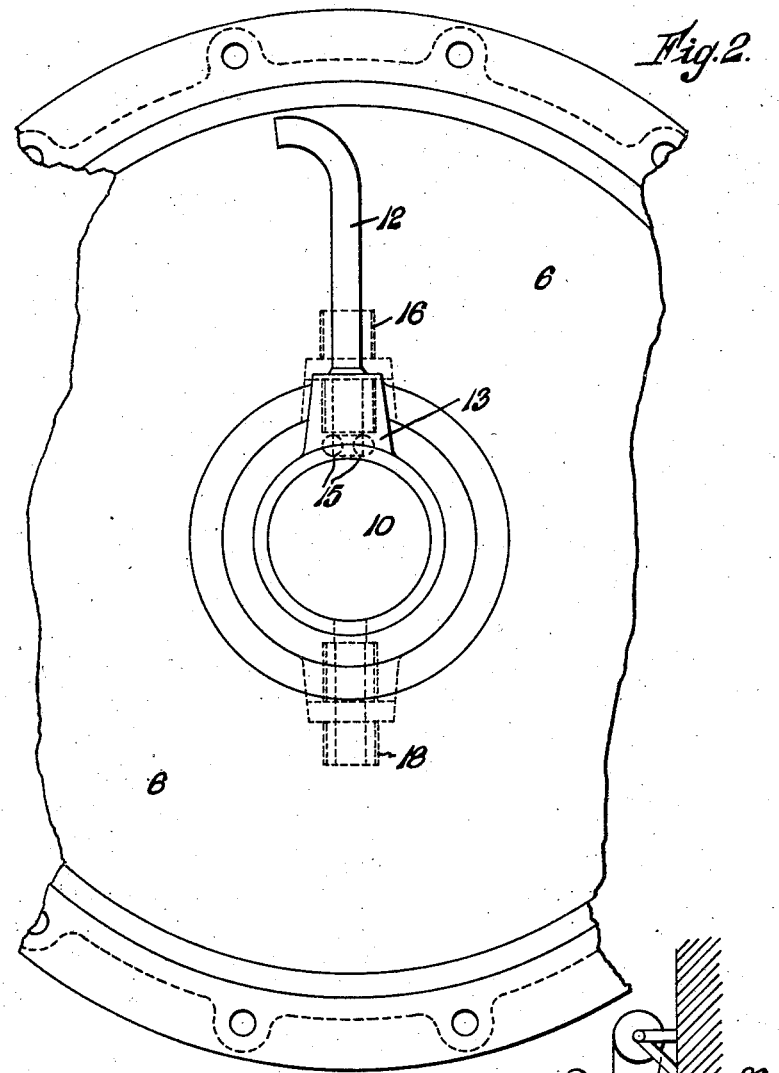
Fig. 2 is an end view of the casing and liquid withdrawing means, the remainder of the coupling being removed.

Referring to Figs. 1 and 2, 1 is a motor shaft, or other driving shaft, on which is keyed to sleeve 2 to which in turn is bolted the impeller member 3 of the coupling. To the latter is bolted the internal casing member 5 and the external casing member 6, all of which rotate with the driving shaft 1. The bolts are, however, not shown. The runner member 7 of the coupling is secured by studs and nuts 8 to a flanged sleeve 9 keyed to the driven shaft 10.

Between the casing members 5, 6 is formed a space 11, which may be termed the withdrawal chamber, in which is located a stationary scoop tube 12 which constitutes the transfer member, for transferring liquid from the coupling. This tube is mounted on a stationary sleeve 13 surrounding the sleeve 9 and bolted to the end cap 14. The tube 12 connects at its radially inner end with a port or ports 15 in the sleeve 13, which at the outer end of the sleeve connect with a discharge pipe socket 16 mounted in the sleeve. On the opposite side of the sleeve 13 from the ports 15 is cut a channel 17, which at its outer end communicates with an inlet pipe socket 18 mounted in the sleeve and at its inner end communicates with a number of channels 19 establishing connection between the feed pipe 18 and the working chamber of the coupling. Between the outer end of sleeve 9 and the end cap 14 is a thrust ring 20 which rotates with sleeve 9 relatively to cap 14, forming a gland, and between the inner edge of the outer casing member 6 and the sleeve 13 is a thrust ring 21 similarly forming a gland. A spiral spring 22 between the inner ends of the shafts 1 and 10, with interposed washer 23 and ball 24, serves to keep the thrust rings sealed when there is no hydraulic thrust acting to separate the impeller and runner, e. g. when the coupling is at rest. One or more ports 35 are provided to connect the withdrawal chamber 11 with the working chamber and these ports may be made adjustable, for example by means of the valve 36.

Referring to Fig. 3, a driving machine 25 (which may for example be an electric motor) is coupled to a driven machine 26 through a hydraulic coupling 27 of the kind shown in Fig. 1. The scoop tube 12 is connected through a discharge tube 28 with a pressure tank 29 which may be pumped up for a start by hand pump 29 A or other convenient means, the pressure being maintained automatically afterwards at a value depending upon circumstances. A non-return valve 30 may be provided in the tube 28 if desired and the lower end of the tube 28 may project below the surface of the liquid in the tank 29 so that the coupling may be assisted to empty, when stationary, by siphon action. The tank 29 is furnished with a coupling feed pipe 31 which is connected with the inlet pipe socket 18 (Fig. 1) on the coupling. In the feed pipe 31 is a speed control valve 32 which may, if desired, be arranged at some distance from the machinery. A reducing valve 33 may also be provided in the feed pipe 31 to maintain a steady pressure at the control valve 32, or alternatively the tank may be provided with an air blow-off valve 33 A set at a convenient pressure with the same object. A release valve 34 opened by a spring or gravity is arranged in the tank 29 to release the pressure in the tank when the machinery is brought to rest. This release valve may be closed when the coupling is started up by an electromagnet connected to the circuit of the motor 25 or by the pressure in the discharge pipe 28 or by other suitable means.

The operation of the arrangement (with reference to Figs. 1 and 3) is as follows: When the impeller 3 is rotating, liquid is constantly passing, at a predetermined rate, from the working chamber between the impeller and the runner to the withdrawal chamber 11 through the ports 35 and, in consequence of its impingement against the open end of the scoop tube 12, it is ejected through the discharge tube 28 into the tank 29. This "loss" of liquid from the coupling, which is small in quantity, is continuously replaced through the feed pipe 31. As an example, with the impeller running at full speed with the working chamber full, the rate of "loss", corresponding to the centrifugal head and the effective area of the transfer ports 35, has been found in one case to be 10 gallons per minute. So long as the control valve 32 is kept wide open this "loss" is continuously made good so that the working chamber remains full. Assuming, now, that the control valve is partially closed so that the inflow rate is, say, 8 gallons per minute, the working chamber will commence to empty and the speed of the driven shaft will fall, due to increased "slip" between the impeller 3 and the runner 7. As the working chamber empties, the centrifugal head on the transfer ports 35 falls with the result that the rate of "loss" to the withdrawal chamber is decreased. A point is shortly reached when the rate of "loss" balances the rate of feed, namely 8 gallons per minute in the example quoted, and the arrangement is then stable at the reduced speed corresponding to the existing degree of filling of the working chamber and the load transmitted.

Similarly, if the control valve is set for an inflow rate of 6 gallons per minute, the coupling will empty further until the rate of "loss" again balances the rate of feed and the driven machine will then run steadily at a still further reduced speed.

In cases where it is essential that the speed should change quickly when the control valve setting is changed, it is necessary that the transfer ports should have a relatively large area, whilst in other circumstances where a time lag of, say, 30 seconds is unimportant, the transfer ports may be small.

It should be mentioned that the scoop tube picks up and transfers to the tank a certain amount of air together with the oil or other liquid with the useful result that, this entrained air serves to maintain the pressure above the liquid in the tank.

It is found that the pressure which can be developed in the discharge tube is great enough for all normal requirements, and since in fact the working pressure in the tank is very low (for example a few lbs. per square inch), the power consumed due to the resistance of the liquid against the tip of the scoop tube is quite negligible.

Suitable relief ports or valves may be provided in the casing of the coupling to assist displacement of air when filling but these are not shown in the drawings.

Since speed regulation is obtained by varying the "slip" it will be apparent that speed reduction is accompanied by a drop in efficiency, with consequent heating of the liquid.

The cooling effect due to the rotation of the impeller casing in contact with the outside air has been found satisfactory for most conditions, but this may be increased by adding cooling vanes 3a. If it is desired to work for lengthy periods under conditions of high power and "slip", the coupling may be arranged in a splash-tight casing and kept cool by the application of water.

In certain circumstances the driven shaft may be connected to the element carrying the internal and external casings 5 and 6, the motor being connected to the other element. In this arrangement the cooling is less effective when the speed of the driven shaft falls but, on the other hand, the speed regulation may be improved since the reduction in the rate of flow through the discharge ports 35 is affected both by the reduction in centrifugal head due to the emptying of the working chamber and also by the reduction in centrifugal head due to the fall in speed of the driven shaft. In most cases, however, it is preferable that the impeller and the liquid withdrawal chamber should be connected to the driving shaft.

Figure 4:
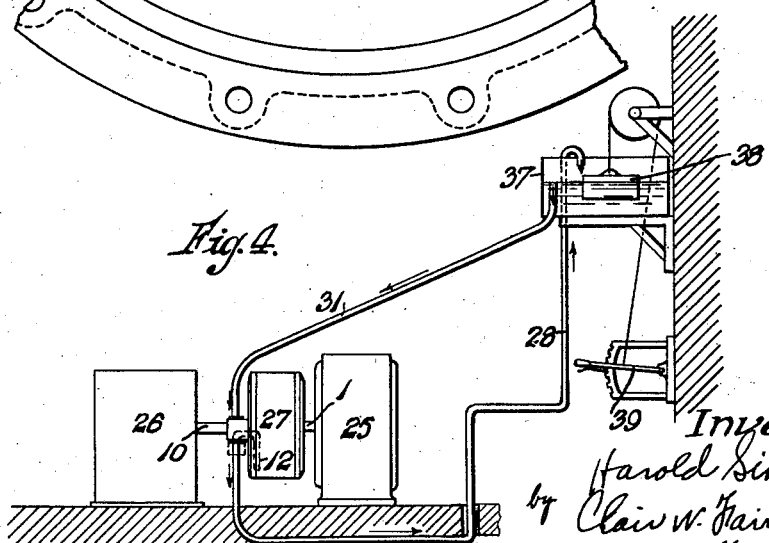

In the alternative arrangement shown in Fig. 4, a gravity tank 37 is provided. The discharge tube 28 from the coupling is arranged to discharge into the top of the tank 37 whilst the feed pipe 31 has its mouth normally level with the liquid about half-way up from the bottom of the tank 37. In the tank is suspended a displacement weight 38 the height of which is adjustable by means of the lever 39. If the weight 38 is raised, by lowering the lever 39, the level of the liquid in the tank will fall below the inlet of pipe 31, thus cutting off the feed to the coupling, meanwhile the discharge through pipe 28 continues so that the coupling empties, and the tank fills, until the liquid again overflows down feed pipe 31 back into the coupling, the rate of feed then balancing the rate of "loss" so that no further reduction of the runner speed takes place. A similar result may be secured by raising or lowering the end of the feed pipe 31 as desired, instead of varying the position of the displacement weight 38.

Figure 5:
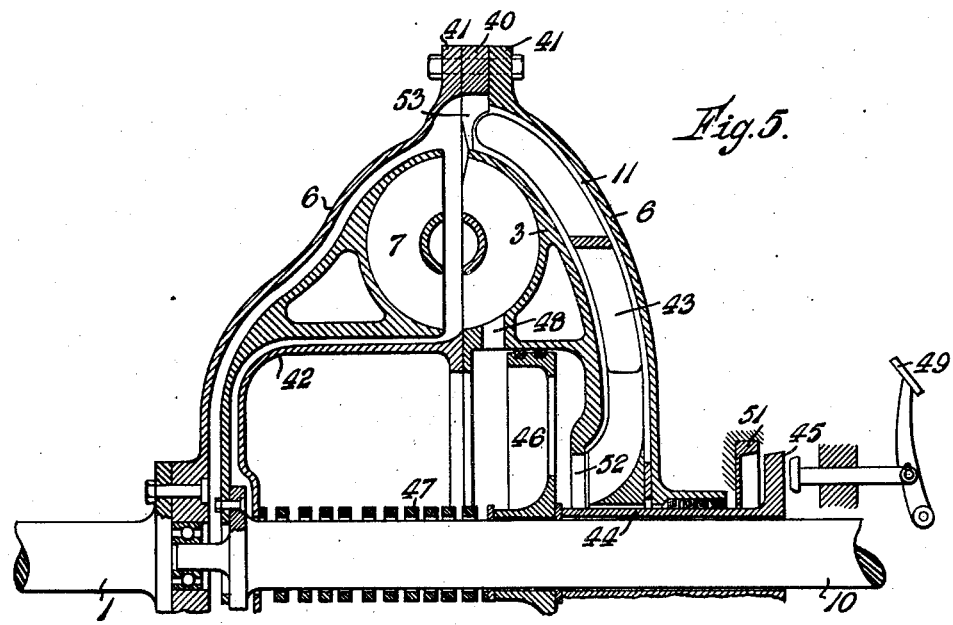
Fig. 5 is a view in part sectional elevation of a further form of the invention.
Figure 6:
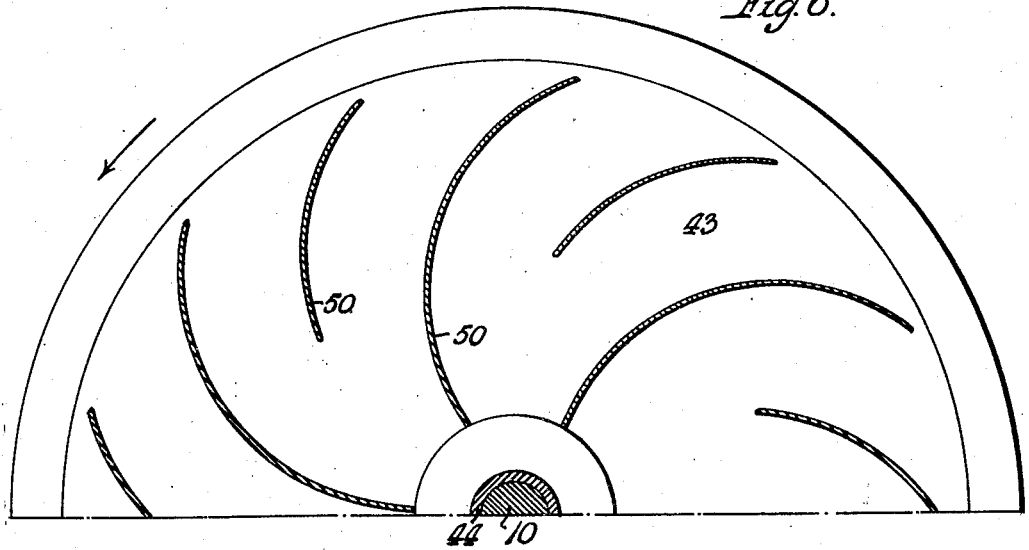
Fig. 6 is an end view of a part of the mechanism shown in Fig. 5, the parts being shown in section.

In the form of the invention illustrated somewhat diagrammatically in Fig. 5, the casing 6 is connected to the driving shaft 1, the impeller 3 being provided with a flange 40 by which it is bolted to the flanges 41 of the casing 6. The member 42 which constitutes a reservoir chamber is also attached to the impeller member 3 by suitable means which are not shown. The runner 7 is connected to the driven shaft 10. In the space 11 between the impeller 3 and the casing 6 is arranged a transfer element 43 to which a sleeve 44 is slidably connected by means of suitable splines. The sleeve 44 which is free to rotate upon the driven shaft 10 is provided with a flange 45. The inner end of the sleeve 44 bears against a valve 46 which is pressed towards the right by a spring 47. The parts 44, 46, 47 and 42 rotate with the impeller 3 the casing 6 and the driving shaft 1. The impeller is normally in connection with the reservior space 42 through ports 48 but by moving the valve 46 to the left, by depressing the pedal 49, the ports 48 can be closed. Fig. 6 is a diagrammatic view of the transfer element 43 showing the curved blades 50 with which it is provided, but the number and curvature of these blades may be varied widely according to the requirements.

The operation of the arrangement is as follows: Starting with the spaces outside the reservoir chamber 42 full of oil, power is transmitted with minimum "slip" from the driving shaft 1 to the driven shaft 10 through the hydraulic coupling between the impeller 3 and the runner 7. Any liquid which tends to find its way into the chamber 42 is thrown outwards through the ports 48. The transfer element 43 is carried around with the impeller 3, by the drag of the liquid within the space 11, the direction of rotation being indicated by the arrow in Fig. 6. When it is desired to de-clutch, the pedal 49 is depressed thereby moving the coned outer surfaces of the flange 45 into engagement with the fixed member 51. The transfer element 43 which is connected with the sleeve 44 by splines is thus brought to rest and the liquid within the space 11 impinges (in the direction of the arrow in Fig. 6) upon the blades 50 of the transfer element 43 and is forced through the aperture 52 in the impeller into the reservoir 42. By the depression of the pedal 49, the valve 46 has also been moved to the left to close the ports 48 and the liquid forced into the reservoir 42 cannot therefore escape. The liquid in the working chamber between elements 3 and 7 also passes through the parts 53 into the space 11 and is forced by the stationary blades of the transfer element 43 into the reservoir 42 until the coupling liquid has all passed into the reservoir. It will be clear that by suitable lighter pressure upon the pedal 49, the degree of filling of the working chamber, and consequently the "slip" can be more or less graduated as desired.

When the pedal is released, the liquid is thrown by centrifugal force through the ports 48 into the working chamber and the transfer element is once more free to rotate with the impeller. The "slip" is therefore reduced once more to its original low value.

In Fig. 8 is shown an alternative construction on the same lines as Fig. 5 but in which the valve 46 and ports 48 are omitted, and the inlet area 52' in increased in size to the full diameter of reservoir chamber 42 and the member 43' is rigidly connected to the sleeve 44'. Then the effect of depressing pedal 49 is to bring the brake shoe 49' into contact with the brake drum 45' and thereby to arrest the rotation of transfer element 43' with the result that liquid is transferred into the reservoir chamber 42 and kept there, so long as 43' is stationary, by the "crowding in" of further liquid being extracted from chamber 11. Upon releasing the element 43' the liquid in the reservoir chamber will be free to return to the working chamber via chamber 11 and port 53. Since in the construction shown in Fig. 5 the working chamber surrounds the reservoir chamber the diameter is considerable, hence to reduce the overall dimensions it may be preferred to use a liquid of great density, e. g. mercury.

In the arrangement illustrated diagrammatically in Fig. 7, a transfer element 43 is arranged in the space 11 between the runner 7 and the casing 6. This transfer element is provided with blades somewhat as shown in Fig. 6. A reservoir chamber 54 is secured to the casing 6 and within the chamber 54 is a second transfer element 55, also suitably provided with blades. The element 43 is secured to a sleeve 58 which is rotatable upon the shaft 10 whilst the element 55 is mounted upon a sleeve 59 which is rotatable upon the sleeve 58. The sleeve 58 is provided at its outer end with a flange or drum 56 whilst the sleeve 59 is similarly provided with a drum 57. Suitable means, which are not illustrated, are provided for braking either of the drums 56 or 57 independently.

In operation, assuming that shaft 1 is driving shaft 10 through the hydraulic coupling between the impeller 3 and the runner 7, the working chamber of the coupling being full of liquid, the elements 43 and 55 will rotate with the shaft 10, since they are free to do so, and the working chamber will remain full. If, now, it is desired to empty the working chamber, the brake is applied to drum 56 thus partially or entirely arresting the rotation of the transfer element 43. The liquid in the space 11 therefore impinges on the blades of the element 43 and owing to the shape of the blades is forced through the space 60 into the reservoir chamber 54. When the desired amount of "slip" has been obtained the brake upon the drum 56 is released and the coupling will then continue to run with a constant degree of filling of reduced amount. When it is desired to increase the filling, and so decrease the "slip", the brake is applied to drum 57 thus partially or entirely stopping the rotation of the element 55 the blades of which are so shaped that liquid impinging upon them is forced through the space 60 back into the working chamber.

It will be clear that in all the arrangements described the energy of movement of the liquid within the coupling is utilized for transferring liquid to and from the working chamber. In the arrangement of Fig. 4 for example the energy of movement of the liquid serves to remove liquid from the working chamber of the coupling 27 and to raise it to the tank 37. The liquid in the tank 37 has potential energy derived from the energy of movement and this potential energy serves to deliver liquid to the coupling 27.

Although in the examples of the invention above described the energy of motion which is utilized for transferring liquid to and from the working chamber of the coupling is derived from the rotational motion of the liquid about the shaft axis, it will be clear that, if desired, the circulatory motion of the liquid between impeller and runner may be used for this purpose.

Although the invention has been described in its application to transmission gears, it will be clear that it may also be applied to brakes. For example in the arrangement of Fig. 4, the element 25 would represent the mechanism to be braked whilst the shaft 10 would be fixed. When under these circumstances the coupling 27 is empty, no braking effect is exerted upon the mechanism 25 and as the degree of filling is increased, by raising the lever 39, the braking effect increases until the working chamber of the coupling is full and the braking effect is a maximum. A similar action may be obtained with the arrangements shown in the other figures.

I claim:

1. A hydraulic coupling comprising an impeller element, a runner element, an annular working chamber, a rotatably mounted transfer chamber, a connection between said chambers disposed near the outer periphery of said working chamber, a reservoir chamber, stationary means within said transfer chamber adapted to maintain a circulation of liquid between said transfer chamber and said reservoir chamber whilst said working chamber is rotating and a conduit for returning liquid from said reservoir chamber to said working chamber.

2. A hydraulic coupling of the kinetic type comprising an impeller rotor and a driven rotor forming between them a working chamber for the coupling liquid, said coupling having a separate rotatable chamber and a transfer member disposed within last mentioned chamber, both of said rotors being adapted to rotate with respect to said transfer member, and said transfer member being adapted to remove coupling liquid from said working chamber.

3. A hydraulic coupling of the kinetic type comprising coaxially rotatable impeller and runner elements forming between them a working chamber for the coupling liquid, and a transfer member rotatable relative to both of said elements and located within a rotatably mounted part of said coupling, said transfer member being adapted to engage the coupling liquid, and, by relative motion between said transfer member and the coupling liquid, to impart to the liquid a motion directed at least in part towards the axis of said elements.

4. A hydraulic coupling of the kinetic type comprising co-operating impeller and runner elements forming between them a working chamber for the coupling liquid, a reservoir chamber, and a transfer member having one end in hydraulic communication with said reservoir chamber, and having its other end disposed within a rotatable part of said coupling, said transfer member being adapted to engage said coupling liquid, and being directed substantially tangentially and in the opposite direction to the direction of motion of the coupling liquid adjacent thereto.

5. A hydraulic coupling of the kinetic type comprising a centrifugal pump impeller and a turbine rotor mounted for rotation about a common axis and forming between them a chamber for the coupling liquid, a rotatable casing part, a transfer member disposed within said casing part and mounted for rotation about said axis relative to one of said elements, and means for controlling the rotational speed of said transfer member.

6. A hydraulic coupling of the kinetic type comprising co-operating impeller and runner elements forming between them a working chamber for the coupling liquid, an auxiliary chamber mounted for rotation with one of said elements and separate from but in communication with said working chamber, and a transfer member located within said auxiliary chamber, and both of said elements being adapted to rotate with respect to said transfer member, and said transfer member being adapted to remove coupling liquid from said working chamber.

7. A hydraulic coupling of the kinetic type comprising co-operating axially rotatable impeller and runner elements forming between them a working chamber for the coupling liquid, an auxiliary chamber mounted for rotation with one of said elements and separate from but in communication with said working chamber, and a transfer member located within said auxiliary chamber, said transfer element being adapted to engage the coupling liquid, and, by relative motion between said transfer element and the coupling liquid, to impart to the liquid a motion directed at least in part towards the axis of said elements.

8. A hydraulic coupling of the kinetic type comprising co-operating impeller and runner elements forming between them a working chamber for the coupling liquid, an auxiliary chamber mounted for rotation with one of said elements and separate from but in communication with said working chamber, and a transfer member located within said auxiliary chamber, one end of said member being directed substantially tangentially and in the opposite direction to the direction of motion of the coupling liquid in its neighborhood.

9. A hydraulic coupling of the kinetic type comprising co-operating impeller and runner elements forming between them a working chamber for the coupling liquid, a reservoir adapted to rotate with one of said elements, and a transfer member disposed within a rotatably mounted part of said coupling and adapted to transfer liquid from said working chamber to said reservoir.

10. A hydraulic coupling of the kinetic type comprising co-operating impeller and runner elements forming between them a working chamber for the coupling liquid, a reservoir chamber adapted to rotate with one of said elements, a transfer member disposed within a rotatably mounted part of said coupling and adapted to transfer liquid from said working chamber to said reservoir chamber and a transfer element located within said reservoir chamber and adapted to transfer liquid from said reservoir chamber to said working chamber.

11. A hydraulic coupling of the kinetic type comprising co-operating impeller and runner elements forming between them a working chamber for the coupling liquid, a reservoir chamber adapted to rotate with one of said elements, a rotatably mounted transfer member disposed within a rotatably mounted part of said coupling and adapted to remove liquid from said part and means for varying the rotational speed of said transfer member.

12. A hydraulic coupling including a centrifugal pump rotor and a coaxial turbine rotor forming between them a working chamber for the coupling liquid, a casing secured to one of said rotors and providing an annular rotatable liquid transfer chamber communicating with the working chamber at the periphery of the latter, and a conduit projecting into said transfer chamber in a direction having a radial component and terminating in a tangentially facing inlet adjacent to the periphery of the transfer chamber, and means for preventing rotation of said conduit about the axes of the rotors whereby upon the opening of the conduit the liquid will be automatically discharged from the coupling through said conduit.

13. A hydraulic coupling, including a driving member and a driven member conjointly defining a fluid working chamber, a reservoir chamber within the field of rotation of said members, and having a capacity at least as large as the capacity of the working chamber, said coupling being provided with a passageway between said reservoir chamber and said working chamber, and means employing the energy of motion of the working fluid, and located within a rotating part of said coupling, for directing said fluid through said passageway.

14. A hydraulic coupling including a driving member and a driven member conjointly defining a fluid working chamber, a reservoir chamber within the field of rotation of said members and mounted for rotation with one of said members, said reservoir chamber having a capacity at least as large as the capacity of the working chamber, said coupling being provided with a passageway between said working chamber and said reservoir chamber, and means employing the energy of motion of the working fluid, and located within a rotating part of said coupling for directing said fluid through said passageway.

15. A hydraulic coupling including a driving member and a driven member conjointly defining a fluid working chamber, a reservoir chamber within the field of rotation of said members and coaxially mounted therewith, said chamber being mounted for rotation with one of said members, and having a capacity at least as large as the capacity of the working chamber, said coupling being provided with a passageway between said reservoir chamber and said working chamber, and means employing the energy of motion of the working fluid, and located within a rotating part of said coupling, for directing said fluid through said passageway.

16. A hydraulic coupling including a driving member and a driven member conjointly defining a fluid working chamber, a reservoir chamber mounted for rotation with one of said members, and having a capacity at least as large as the capacity of said working chamber, said coupling being provided with a passageway between said working chamber and said reservoir chamber, means employing the energy of motion of the working fluid, and located within a rotating part of said coupling, for directing said fluid through said passageway, and an axially movable member for controlling the flow of fluid between said working chamber and said reservoir chamber.

17. A hydraulic coupling comprising an impeller rotor and a driven rotor forming between them a working chamber for the coupling liquid, said coupling having a transfer chamber in hydraulic communication with but separated from said working chamber and rotating with one of said rotors, and a liquid transfer member employing the energy of motion of said liquid and disposed within said transfer chamber, both of said rotors being adapted to rotate with respect to said transfer member.

In testimony whereof I have signed my name to this specification.

HAROLD SINCLAIR.